(12) United States Patent
Zischka et al.

(10) Patent No.: US 11,124,148 B2
(45) Date of Patent: Sep. 21, 2021

(54) SEAT-MOUNTED VEHICLE OCCUPANT RESTRAINT DEVICE

(71) Applicant: TRW AUTOMOTIVE GMBH, Aldorf (DE)

(72) Inventors: Gerd Zischka, Schwäbisch Gmünd (DE); Dominique Acker, Gschwend (DE); Jürgen Scherr, Waldstetten (DE); Marco Wahl, Sulzbach-Laufen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 33 days.

(21) Appl. No.: 16/077,058

(22) PCT Filed: Feb. 2, 2017

(86) PCT No.: PCT/EP2017/052253
§ 371 (c)(1),
(2) Date: Aug. 10, 2018

(87) PCT Pub. No.: WO2017/137303
PCT Pub. Date: Aug. 17, 2017

(65) Prior Publication Data
US 2019/0047507 A1    Feb. 14, 2019

(30) Foreign Application Priority Data

Feb. 11, 2016   (DE) ............... 10 2016 001 585.3

(51) Int. Cl.
*B60R 21/2338*   (2011.01)
*B60R 21/207*    (2006.01)
(Continued)

(52) U.S. Cl.
CPC ........ *B60R 21/2338* (2013.01); *B60N 2/6009* (2013.01); *B60R 21/207* (2013.01);
(Continued)

(58) Field of Classification Search
CPC .......... B60R 2021/23146; B60R 2021/23153; B60R 2021/23161; B60R 2021/161;
(Continued)

(56) References Cited

U.S. PATENT DOCUMENTS 5,499,840 A    3/1996  Nakano
5,799,971 A *  9/1998  Asada .................. B60R 21/207
                                                            280/728.3
(Continued)

FOREIGN PATENT DOCUMENTS

DE    102006050868    4/2008
DE    102006052799    5/2008
(Continued)

*Primary Examiner* — Laura Freedman
(74) *Attorney, Agent, or Firm* — Tarolli, Sundheim, Covell & Tummino LLP

(57) ABSTRACT

A vehicle occupant restraint device (10) comprises a pre-assembled head side airbag module (12) installed in a backrest (14) of a vehicle seat (16) and including an airbag (28) which deploys between two places adjacent transversely to the longitudinal vehicle direction and reduces lateral oscillation of a vehicle occupant toward an adjacent vehicle seat and/or an adjacent vehicle occupant. The head side airbag module (12) comprises a module housing (32) surrounding the airbag (28) at least partially in the installed condition which includes a guiding portion (34) extending on the side of the airbag (28) and exerting a force (F) upon the deploying airbag (28) so that during deployment the latter is pressed in the direction of the vehicle occupant to be restrained.

22 Claims, 3 Drawing Sheets

(51) Int. Cl.
  *B60R 21/231* (2011.01)
  *B60N 2/60* (2006.01)
  *B60R 21/233* (2006.01)
  *B60R 21/235* (2006.01)

(52) U.S. Cl.
  CPC .......... *B60R 21/233* (2013.01); *B60R 21/235* (2013.01); *B60R 21/23138* (2013.01); *B60R 2021/23146* (2013.01); *B60R 2021/23153* (2013.01); *B60R 2021/23161* (2013.01); *B60R 2021/23509* (2013.01); *B60R 2021/23538* (2013.01); *B60R 2021/23542* (2013.01)

(58) Field of Classification Search
  CPC .......... B60R 2021/23308; B60R 2021/23382; B60R 2021/23386; B60R 2021/23509; B60R 2021/23523; B60R 2021/23538; B60R 2021/23542; B60R 2021/23547; B60R 2021/23566; B60R 21/207; B60R 21/23138; B60R 21/233; B60R 21/2338; B60R 21/235; B60N 2/6009
  See application file for complete search history.

(56) References Cited

U.S. PATENT DOCUMENTS

| | | | |
|---|---|---|---|
| 6,478,329 | B1 | 11/2002 | Yokoyama |
| 7,717,459 | B2 * | 5/2010 | Bostrom ........... B60R 21/23138 |
| | | | 280/730.1 |
| 7,971,901 | B2 * | 7/2011 | Tomitaka ............... B60R 21/207 |
| | | | 280/730.2 |
| 8,282,126 | B2 * | 10/2012 | Wiik ................. B60R 21/23138 |
| | | | 280/730.2 |
| 8,353,527 | B2 * | 1/2013 | Sugimoto ............. B60R 21/207 |
| | | | 280/730.2 |
| 9,193,326 | B2 * | 11/2015 | Fukawatase ...... B60R 21/23138 |
| 9,290,151 | B2 * | 3/2016 | Fujiwara ............... B60R 21/231 |
| 9,296,356 | B2 * | 3/2016 | Fujiwara ............... B60R 21/233 |
| 9,365,180 | B2 * | 6/2016 | Acker .................... B60R 21/207 |
| 9,409,540 | B2 * | 8/2016 | Fujiwara ............... B60R 21/207 |
| 9,469,268 | B2 * | 10/2016 | Sugimoto ......... B60R 21/23138 |
| 9,533,648 | B2 * | 1/2017 | Fujiwara ............... B60R 21/207 |
| 9,545,893 | B2 * | 1/2017 | Fujiwara ............... B60R 21/207 |
| 9,669,789 | B2 * | 6/2017 | Fujiwara ........... B60R 21/23138 |
| 9,688,234 | B2 * | 6/2017 | Yamanaka ............ B60R 21/233 |
| 10,035,485 | B2 * | 7/2018 | Fujiwara ................. B60R 21/26 |
| 10,166,945 | B2 * | 1/2019 | Fujiwara ........... B60R 21/23138 |
| 10,214,172 | B2 * | 2/2019 | Fujiwara ............. B60R 21/0136 |
| 2006/0138757 | A1 | 6/2006 | Riedel et al. |
| 2006/0163850 | A1 | 7/2006 | Inazu et al. |
| 2006/0163860 | A1 | 7/2006 | Fuchigami |
| 2006/0255572 | A1 | 11/2006 | Svenbrandt et al. |
| 2015/0084315 | A1 | 3/2015 | Acker et al. |
| 2015/0283970 | A1 | 10/2015 | Line et al. |
| 2015/0367803 | A1 | 12/2015 | Fujiwara |
| 2016/0159305 | A1 | 6/2016 | Makita |

FOREIGN PATENT DOCUMENTS

| | | |
|---|---|---|
| DE | 102015205835 | 10/2015 |
| JP | 2008080988 | 4/2008 |
| JP | 2011178189 A * | 9/2011 |

* cited by examiner

SEAT-MOUNTED VEHICLE OCCUPANT RESTRAINT DEVICE

RELATED APPLICATIONS

This application corresponds to PCT/EP2017/052253, filed Feb. 2, 2017, which claims the benefit of German Application No. 10 2016 001 585.3, filed Feb. 11, 2016, the subject matter of which are incorporated herein by reference in their entirety.

BACKGROUND OF THE INVENTION

The invention relates to a vehicle occupant restraint device comprising a pre-assembled head side airbag module installed in a backrest of a vehicle seat and including an airbag which deploys between two places adjacent transversely to the longitudinal vehicle direction and reduces lateral oscillation of a vehicle occupant toward a neighboring vehicle seat and, resp., vehicle occupant.

Airbags nowadays belong to the standard protection devices in the vehicle. The protection to be achieved by airbags becomes more and more efficient and numerous even very complex impact situation can be mitigated by appropriate airbags.

One situation in the vehicle which recently has been subject to special research is a side impact during which the vehicle occupant may contact structural elements within the vehicle or the neighboring occupant due to a lateral oscillating movement during side impact on the side facing away from the occupant or else when swinging back from the side facing the impact to the side facing away from the impact. For said situation so-called center airbags are taken into account that are effective between two occupants positioned laterally next to each other and are employed especially between the front occupants, partially also between the rear occupants.

Usually for such airbags a mounting space is provided within the backrest of the vehicle seat which, in the case of a front occupant restraint device, is located on the side of the driver or passenger seat facing the center console. Center airbags customary in the market frequently bear on the center console in order to fun their protective function.

Due to the fact that on the market there are offered both vehicles having a distinct center console, frequently in the luxury-class segment, and vehicles having no elevated center console, especially vehicles in the lower-class segment, this technology cannot be universally applied.

SUMMARY OF THE INVENTION

Therefore, it is the object of the invention to provide a vehicle occupant restraint device comprising a head side airbag module which safely protects the vehicle occupant from over-oscillating without the airbag bearing against a center console or the like.

In accordance with the invention, for this purpose in a vehicle occupant restraint device of the type mentioned in the beginning the head side airbag module is provided to include a module housing at least partially surrounding the airbag in the installed condition, the module housing having a guiding portion extending on the side of the airbag and exerting force upon the deploying airbag so that during deployment the latter is pressed in the direction of the vehicle occupant to be withheld. In this way, reliable positioning of the deploying airbag close to the vehicle occupant to be restrained is ensured, wherein the position of the airbag is maintained even in the deployed state. At the same time, by fixing the airbag via the guiding portion of the module housing oscillation and rotation of the airbag about the transverse vehicle direction also referred to as y-axis is reduced or, resp., completely avoided. Depending on the geometric design of the guiding portion, it is possible to adjust the magnitude of the pressing force and thus to control the degree of pressing the airbag against the vehicle occupant. The configuration according to the invention therefore enables the airbag to do without bearing on a component part located in the vehicle interior, for example a center console or a neighboring seat.

According to a preferred embodiment, the module housing includes a substantially U-shaped cross-section when viewed in the vertical vehicle direction, the guiding portion being formed by a leg of the U. Especially, the opening of the U and, resp., of the module housing points to the deployment direction of the airbag. In this way, a sufficiently high pressing force can be exerted upon the deploying or already deployed airbag. By means of the opening, moreover the deployment direction of the airbag can be influenced and, resp., predetermined and it ensures quick deployment.

As an alternative to the U-shaped design, the guiding portion may also be a separate component; in such case, the head side airbag module consists e.g. of a plate to which an inflator is fastened as well as of a separate guiding portion which is equally connected to the vehicle seat.

For offering sufficient protection in the area of the head, the head side airbag module is preferably arranged in an upper half, especially in an upper third, of the backrest.

Terms such as upper and lower half or the like are always related to a view along the vertical vehicle direction.

Of preference, the head side airbag module is fixed to a seat frame disposed in the backrest, wherein the head side airbag module is integrated in a folded state of the airbag in a seat side bolster of the backrest and is covered by a cushion of the side bolster of the seat and wherein in an inflated state the airbag extends beyond the side bolster. Thus, on the one hand, safe fixation of the head side airbag module on the vehicle seat is obtained. In addition, by integration in the side bolster of the seat the airbag module is completely concealed in the mounting position.

The airbag may include a sewn outer wall the fabric layers of which are joined by sewing at least on a peripheral edge. Here especially fabrics having high strength characteristics are used. Of course, the fabric layers may also be glued or welded to each other.

In another embodiment, the airbag includes an outer wall woven of one single piece the fabric layers of which are interwoven at least at a peripheral edge. This so-called one-piece-woven technique offers the advantage that the airbag walls are more gastight than in the case of joining by sewing, where the stitches may result in small outflow orifices which have to be closed by a complicated sealing method.

In an especially preferred embodiment of the invention, the airbag has at least two nested walls for forming the outer wall, with an inner wall having high gas tightness and an outer wall having high strength. In such "hybrid airbag" especially high internal pressure and long service life can be achieved, as the airbag combines the advantages of improved gas tightness and high structural integrity. In this way, an especially reliable restraining effect is resulting, especially also without the airbag bearing against a component of the vehicle interior.

In one development of the invention, the airbag includes a first chamber which even in the inflated state is largely surrounded by the module housing as well as a second chamber connected to the first chamber in the deployment direction of the airbag and being fluid-communicated therewith which forms the protection zone of the vehicle occupant. The first chamber is located in direct vicinity of an inflator and preferably has a smaller volume than the second chamber. By the force exerted by the guiding portion upon the first chamber, the second chamber is pressed in the direction of the vehicle occupant to be restrained, thus ensuring positioning of the airbag close to the vehicle occupant and moreover causing oscillation of the airbag about the vehicle y-axis to be reduced.

Accordingly, in the area of the transition from the first chamber to the second chamber inside the airbag a fixing means may be provided for limiting a distance of opposing airbag wall portions. The fixing means is in the form of a tether or fabric layer, for example, wherein the two chambers are not completely separated, however, but are in fluid communication. Such fixing means serves for obtaining a desired flat shape of the airbag in the transverse vehicle direction.

In a preferred embodiment, the side airbag module includes a tensile means, especially a tether the first end of which is permanently fastened to an airbag wall facing the vehicle occupant to be restrained and the second end of which is fixed to the module housing and/or part of the seat frame. The tensile means culls the deploying airbag (in addition to the direction being defined by the guiding portion) to the vehicle occupant so that the airbag is positioned close to the occupant both during and after deployment.

Of preference, the first end of the tensile means is fastened approximately in the area of the transition from the first to the second chamber at the airbag wall, i.e. outside a contact area of the vehicle occupant with the airbag in the case of restraint.

For fastening the second end of the tensile means, especially connecting elements are suited which indicate intended assembly, e.g. clips including a barcode or similar indications of intended assembly.

The module housing may include a tab which in the installed condition encompasses a seat frame of the vehicle seat assigned to the vehicle occupant, wherein the second end of the tensile means is fixed to the tab, especially secured to a hook arranged on the tab. In this way, a modular structure of the head side airbag module is resulting so that during assembly merely the module has to be fastened to the seat frame, for example by means of bolts disposed on the module. In this structure, all component parts required for positioning and restraining are integrated in the module; therefore, it is not necessary to additionally fasten e.g. the tensile means on the seat. This facilitates the assembly and reduces the assembling time, which in turn has a positive effect on the costs.

Advantageously, an airbag wall facing the vehicle occupant in the inflated state of the airbag during deployment is adjacent at least in portions to the vehicle seat assigned to the vehicle occupant. The contact is made especially in the area of the second chamber, with the friction occurring stabilizing the airbag during deployment and positioning so that oscillating movements during deployment will be reduced.

The module housing may advantageously be reduced as to its material thickness in all areas contacting the seat frame, because here the forces during deployment of the airbag are taken up by the seat frame. This helps to further reduce the module weight.

BRIEF DESCRIPTION OF THE DRAWINGS

Further features and advantages will be evident from the following description of a preferred embodiment by way of the enclosed drawings, wherein.

DESCRIPTION

Figure 1:
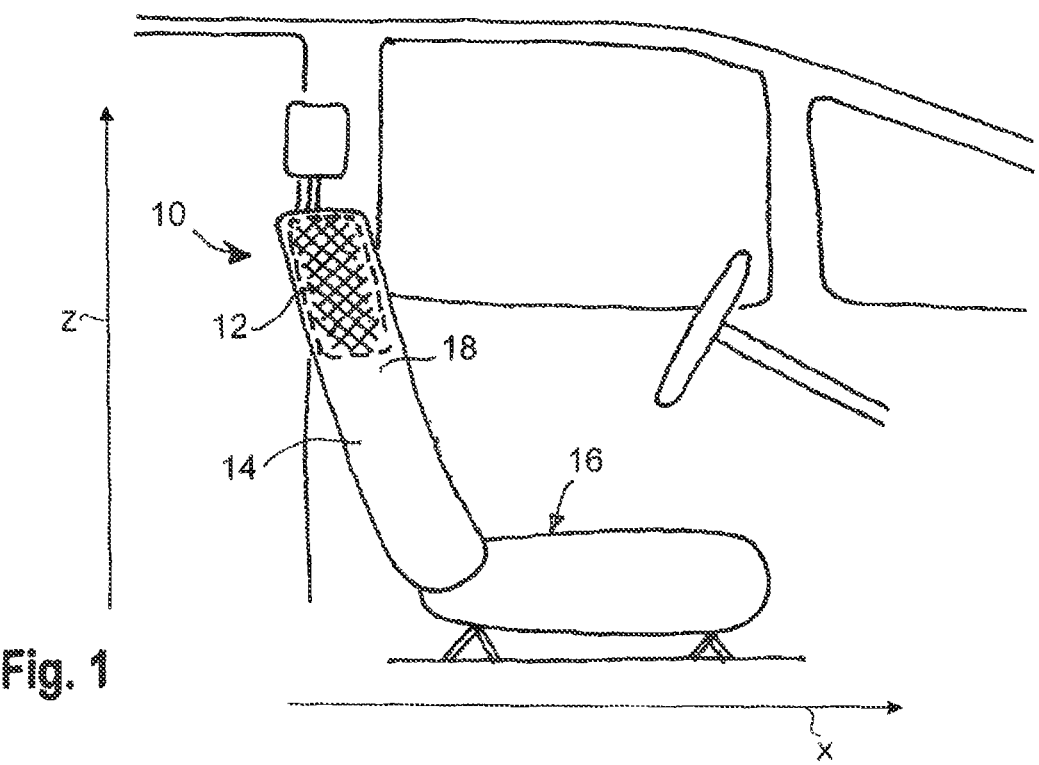
FIG. 1 shows a schematic side view of a vehicle seat comprising a head side airbag module in the installed condition.

The Figures illustrate a vehicle occupant restraint device 10 according to the invention having a pre-assembled head side airbag module 12 which is installed in a backrest 14 of a vehicle seat 16, which is a driver seat in this case. The head side airbag module 12 is integrated in a seat side bolster 18, on the side facing a center console 20 and, resp., a passenger seat 22.

Figure 2:
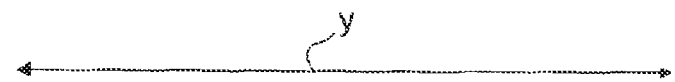
FIG. 2 shows a schematic top view onto two vehicle seats arranged side by side comprising the head side airbag module from FIG. 1.
Figure 2:
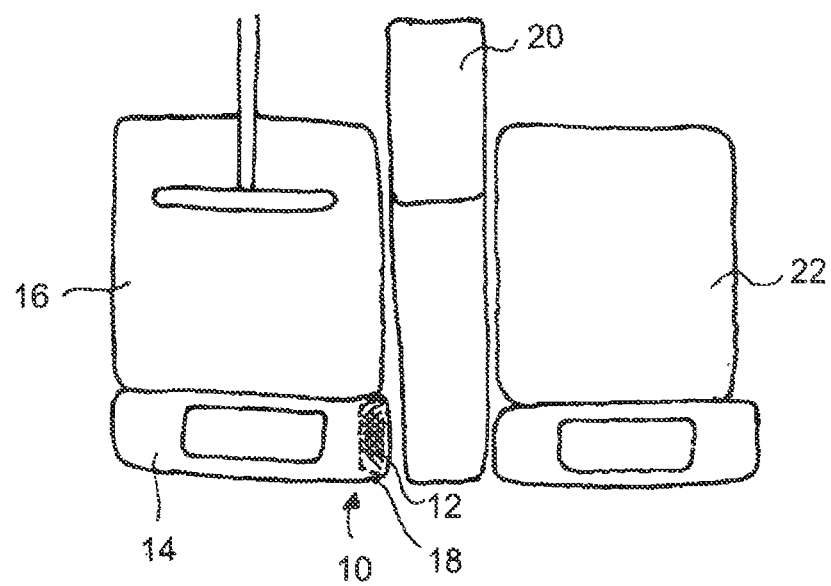

Although the vehicle occupant restraint device 10 in FIG. 2 is shown for the driver seat only, of course also the passenger seat 22 may include an appropriate head side airbag module 12 which then is arranged on the side facing the driver seat. It is equally imaginable to provide the vehicle occupant restraint device 10 according to the invention for the rear occupants. Basically, the vehicle occupant restraint device 10 is effective between two seats adjacent transversely to the longitudinal vehicle direction x and reduces lateral oscillation of a vehicle occupant toward the adjacent vehicle seat and, resp., toward an adjacent vehicle occupant.

Figure 3B:
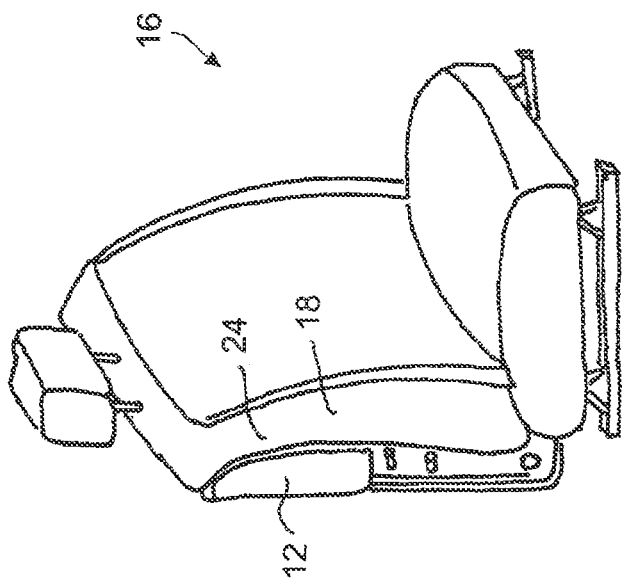
FIG. 3b shows a perspective view of the vehicle seat similar to that of FIG. 3a, but without a back panel.
Figure 3A:
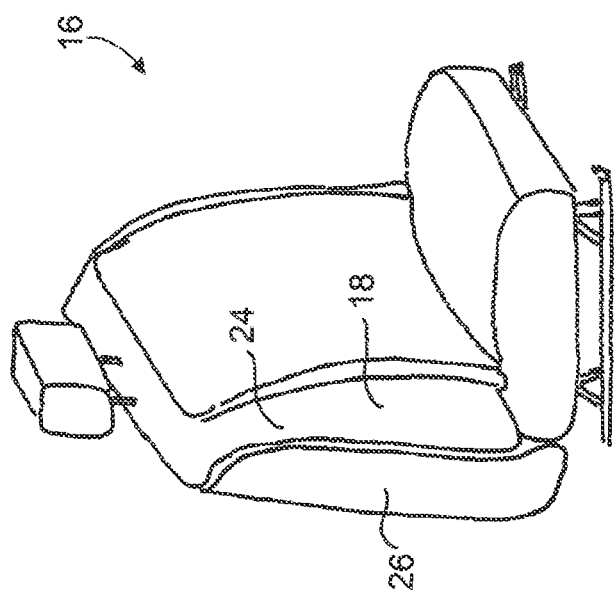
FIG. 3a shows a perspective view of the vehicle seat from FIG. 1.

The head side airbag module 12 is arranged in an upper half, especially an upper third of the backrest 14 (see FIG. 1) and in the installed condition is covered by a cushion 24 of the seat side bolster 18 as well as by a back panel 26, as can be inferred especially from FIGS. 3a and 3b.

The module may as well be covered by a seat cover having a tear seam instead of a back panel in a way known per se.

The head side airbag module 12 includes an airbag 28 (see FIGS. 4a and 4b) which may deploy between the vehicle seat 16 (i.e. the driver seat) and the passenger seat 22. Furthermore, an inflator 30 is provided which, just as the airbag 28, is surrounded in the installed condition at least partially by a module housing 32 having a substantially U-shaped cross-section when viewed in the vertical vehicle direction z.

One leg of the U-shaped module housing 32 facing the passenger seat 22 and, resp., the center console 20 forms a guiding portion 34 which extends on the side of the airbag 28 and exerts force upon the deploying airbag 28 so that during deployment the latter is pressed in the direction of the vehicle seat 16 and of the vehicle occupant to be restrained. The second leg 36 of the U-shaped module housing 32 facing away from the passenger seat 22 merges in one piece into a tab 38 which in the installed condition encompasses a seat frame 40 arranged in the backrest 14, the module housing 32 being fixed on the seat frame 40 by means of two bolts 42. An opening 44 of the module housing 32 located between the legs 34, 36 points in the deployment direction of the airbag 28. Other types of fastening known per se are equally possible.

The airbag 28 has an outer wall 46 formed of two nested walls, wherein the inner wall has high gas tightness and is especially woven of one single piece, the fabric layers being interwoven at least at a peripheral edge. The outer wall of the external wall 46, on the other hand, has high strength and is formed especially by joining fabric layers by sewing at least at a peripheral edge. Said double-layer airbag 28 excels vis-à-vis conventional airbags by a higher internal pressure and longer service life. For reasons of clarity, the representation of the two walls was dispensed with in the Figures.

Alternatively, it is imaginable to make use of a single-layer airbag having a sewn external wall or having an external wall being woven of one single piece.

The airbag 28 moreover is subdivided into a first chamber 48 and a second chamber 50 connected, in the deployment direction of the airbag 28, to the first chamber 48 and being fluid-communicated with the latter. The first chamber 48 has a smaller volume, as evident from FIG. 4b, and is located in direct vicinity of the inflator 30, while the second chamber 50 forms the protection zone of the vehicle occupant seated on the vehicle seat 16.

In the area of transition from the first chamber 48 to the second chamber 50, inside the airbag 28 a fixing means 52 is provided for limiting a distance of opposed airbag wall portions 54, 56. The fixing means 52 is a tether or a fabric layer. The fixing means 52 secures a shape of the airbag 28 which is comparatively flat in the transverse vehicle direction y.

Likewise, in the transition area from the first chamber 48 to the second chamber 50, outside of the airbag wall 56 facing the vehicle occupant to be restrained a first end 58 of a tensile means 60 is permanently fastened. The second end 62 of the tensile means 60, which is in the form of a tether here, is fixed on the module housing 32, more exactly fastened on the tab 38 encompassing the seat frame 40. Especially, the second end 62 is secured to a hook 64 disposed on the tab 38. As an alternative, a riveted connection is imaginable in this case.

It is equally possible to mount the second end 62 of the tensile means 60 directly on the seat frame 40.

Figure 4B:
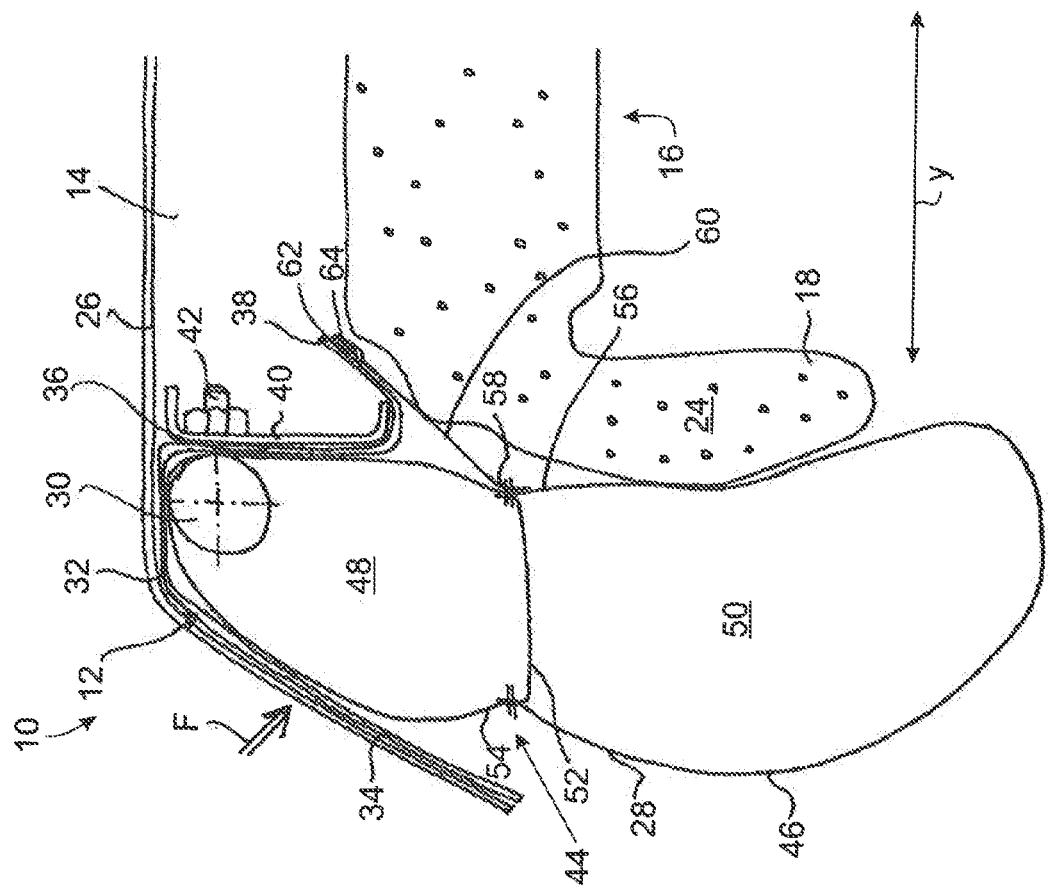
FIG. 4b shows a sectional view of the vehicle seat from FIG. 1 with the head side airbag module being in the triggered state.
Figure 4A:
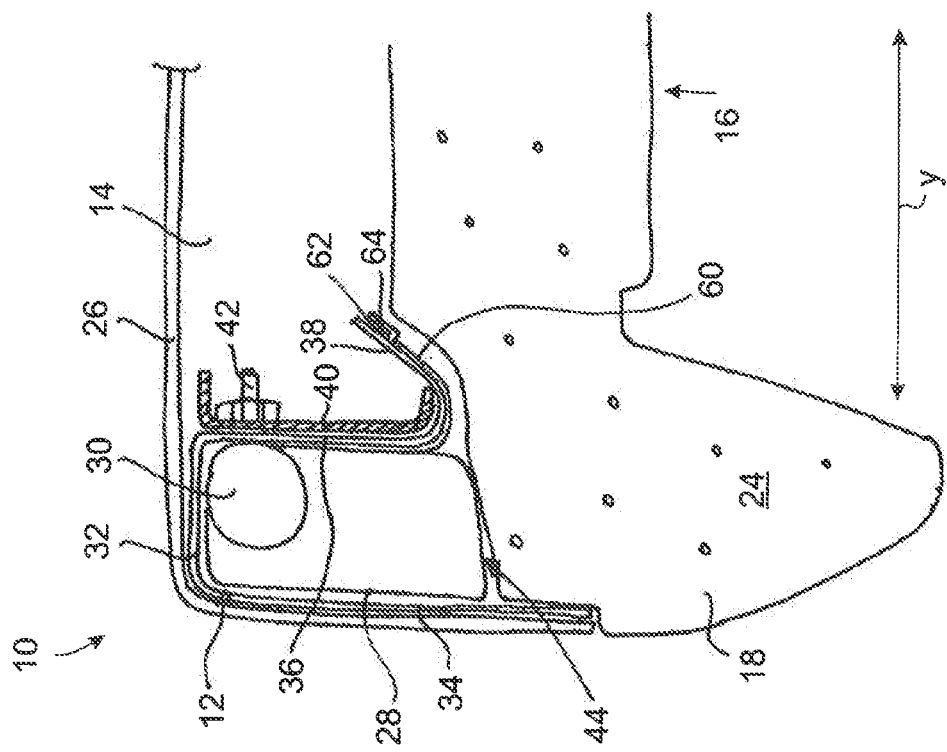
FIG. 4a shows a sectional view of the vehicle seat from FIG. 1 with the head side airbag module being in the installed condition.

In an alternative embodiment, the tab 38 does not end in the position shown in FIGS. 4a and 4b but includes a mounting portion for the tensile means 60 that ends in the area of the back panel 26 or is lengthened here. This also involves facilitated assembly of the module, as the tab need not be guided around the seat frame to the interior.

When, in the event of side impact, the vehicle occupant restraint device 10 is triggered, the airbag 28 deploys through the opening 44, while it presses the cushion 24 of the side bolster 18 of the seat partly to the side (cf. FIG. 4b) and the airbag wall 56 abuts at least in portions on the vehicle seat 16 and, resp., on the cushion 24.

During deployment, the guiding portion 34 exerts a force symbolized by the arrow F in FIG. 4b upon the deploying airbag 28, especially the guiding portion 34 presses on the first chamber 48 which, even in the inflated state of the airbag 28, is largely surrounded by the shell-type module housing 32. Thus, also the second chamber 50 and hence the entire airbag 28 is pressed in the direction of the vehicle occupant to be restrained and, resp., in the direction of the vehicle seat 16. The tensile means 60 pulls the deploying airbag 28 additionally to the vehicle occupant and, resp., to the vehicle seat 16, but due to the mounting in the transition area between the first chamber 48 and the second chamber 50 it will not contact the vehicle occupant.

The clamping and fixing of the airbag 28 by means of the guiding portion 34 as well as the friction occurring by the airbag wall 66 contacting the vehicle seat 16 help to substantially reduce or, resp., completely avoid oscillation and rotation of the airbag 28 about the transverse vehicle axis y, which airbags having a by far larger extension in the vertical vehicle direction z than in the longitudinal and, resp., transverse vehicle direction very strongly tend to do.

Finally, the modular structure of the vehicle occupant restraint device 10 in which all components parts required for positioning and restraining are integrated in the head side airbag module 12 is emphasized. Therefore, it is sufficient to fasten merely the head side airbag module 12 via the bolts 42 located on the module to the seat frame 40.

The invention claimed is:

1. A vehicle occupant restraint device comprising a pre-assembled head side airbag module (12) installed in a backrest (14) of a vehicle seat (16) and including an airbag (28) which deploys between two seats adjacent transversely to a longitudinal vehicle direction (x) and is configured to reduce lateral oscillation of a vehicle occupant to be restrained toward an adjacent vehicle seat and/or an adjacent vehicle occupant, wherein the head side airbag module (12) includes a module housing (32) at least partially surrounding the airbag (28) in the installed condition and having a guiding portion (34) which extends to an inboard side of the airbag (28) so that in response to deployment the guiding portion (34) deflects in a direction inboard of the backrest (14) and exerts a force (F) upon the deploying airbag (28) so that the airbag (28) is pressed in the direction of the vehicle occupant to be restrained, and wherein the head side airbag module (12) includes a tensile means (60), a first end (58) of which is permanently fastened on an airbag wall (56) that is configured to face the vehicle occupant to be restrained and a second end (62) of which is fixed on the module housing (32) and/or on a seat frame (40) disposed in the backrest (14), wherein the tensile means is configured to limit movement of the airbag away from the vehicle occupant, wherein the guiding portion (34) is configured to abut a portion of a cushion (24) of the vehicle seat (16) in a pre-deployment condition of the airbag (28), wherein the module housing (32) includes an opening (44) configured to direct the airbag (28) to deploy between the guiding portion (34) and the portion of the cushion (24) so that the airbag (28) supports the cushion (24) against the vehicle occupant.

2. The vehicle occupant restraint device according to claim 1, wherein the module housing (32) has a substantially U-shaped cross-section when viewed in the vertical vehicle direction (z), wherein the guiding portion (34) is formed by a leg of the U.

3. The vehicle occupant restraint device of claim 2, wherein the opening (44) through which the airbag (28) deploys is located between terminal end portions of legs (34, 36) of the U, the opening (44) pointing in the deployment direction of the airbag (28).

4. The vehicle occupant restraint device according to claim 1, wherein the head side airbag module (12) is arranged in an upper half of the backrest (14).

5. The vehicle occupant restraint device according to claim 1, wherein the head side airbag module (12) is arranged in an upper third of the backrest (14).

6. The vehicle occupant restraint device according to claim 1, wherein the head side airbag module (12) is fixed to the seat frame (40) disposed in the backrest (14).

7. The vehicle occupant restraint device according to claim 1, wherein the airbag (28) includes a sewn external wall (46), fabric layers of the sewn external wall (46) being joined by sewing at least at a peripheral edge.

8. The vehicle occupant restraint device according to claim 7, wherein the airbag (28) includes at least two nested walls for forming the external wall (46), with an inner wall having high gas tightness and an outer wall having high strength.

9. The vehicle occupant restraint device according to claim 1, wherein the airbag (28) includes an external wall (46) woven of one single piece, fabric layers of the one single piece being interwoven at least at a peripheral edge.

10. The vehicle occupant restraint device according to claim 1, wherein the airbag (28) includes a first chamber (48), which is largely surrounded by the module housing (32) even in the inflated state, and a second chamber (50), which is adjacent to the first chamber (48) in the deployment direction of the airbag (28) and in fluid communication with the first chamber (48), the second chamber forming a protection zone for the vehicle occupant to be restrained.

11. The vehicle occupant restraint device according to claim 10, wherein in an area of transition from the first chamber (48) to the second chamber (50) inside the airbag (28), a fixing means (52) is provided which limits a distance of opposed airbag wall portions (54, 56).

12. The vehicle occupant restraint device according to claim 10, wherein the first end (58) of the tensile means (60) is fastened on the airbag wall (56) approximately in an area of transition from the first chamber (48) to the second chamber (50).

13. The vehicle occupant restraint device according to claim 1, wherein the module housing (32) includes a tab (38) which in the installed condition at least partially encompasses the seat frame (40) of the vehicle seat (16) assigned to the vehicle occupant to be restrained, wherein the second end (62) of the tensile means (60) is fixed to the tab (38).

14. The vehicle occupant restraint device according to claim 13, wherein the second end (62) of the tensile means (60) is secured to a hook (64) disposed on the tab (38).

15. The vehicle occupant restraint device according to claim 1, wherein at least a portion of the airbag wall (56), which is configured to face the vehicle occupant in the inflated state of the airbag (28), abuts the vehicle seat (16) assigned to the vehicle occupant during deployment.

16. The vehicle occupant restraint device according to claim 1, wherein the head side airbag module (12) is integrated in a folded state of the airbag (28) in a seat side bolster (18) of the backrest (14) including the cushion (24), the head side airbag module (12) being covered by the cushion (24), and wherein the airbag (28) in an inflated state extends beyond the seat side bolster (18) of the backrest (14).

17. The vehicle occupant restraint device according to claim 1, wherein the cushion (24) is part of the backrest (14) and the module housing (32) is mounted in the backrest (14) and covered by the cushion (24).

18. The vehicle occupant restraint device according to claim 17, wherein the module housing (32) is fixed on the seat frame (40).

19. The vehicle occupant restraint device according to claim 17, wherein in an inflated state of the airbag (28), the guiding portion (34) of the module housing (32) is moved apart from the cushion (24).

20. A vehicle occupant restraint device comprising:
    a pre-assembled head side airbag module configured to be installed in a backrest of a vehicle seat, the airbag module comprising an airbag, an inflator for inflating the airbag, and a module housing for supporting the airbag and the inflator on a seat frame of the backrest;
    wherein the airbag is configured to deploy between two seats adjacent transversely to a longitudinal vehicle direction and configured to reduce lateral oscillation of a vehicle occupant toward an adjacent vehicle seat and/or an adjacent vehicle occupant;
    wherein the airbag comprises first and second inflatable chambers, the first chamber being in the direct vicinity of the inflator and substantially surrounded by the module housing when inflated, the second chamber being configured to form a protection zone for the vehicle occupant;
    wherein the module housing comprises a guiding portion that engages the first chamber and deflects in response to inflation of the first chamber, the guiding portion in response to being deflected exerting a force on the first chamber configured to press the first chamber toward the vehicle occupant, wherein the guiding portion is configured to abut a portion of a cushion of the vehicle seat in a pre-deployment condition of the airbag, wherein the module housing includes an opening configured to direct the airbag to deploy between the guiding portion and the portion of the cushion so that the airbag supports the cushion against the vehicle occupant;
    wherein the airbag comprises a tensile means having a first end connected to an airbag wall configured to face the vehicle occupant at or about a transition between the first and second chambers, the tensile means having a second end connected to the module housing or the seat frame of the backrest, wherein the tensile means is configured to limit movement of the first chamber away from the vehicle occupant.

21. The vehicle occupant restraint device according to claim 20, wherein the airbag comprises a fixing means that interconnects opposing airbag walls at the transition between the first and second chambers, the fixing means limiting a spacing between the opposing airbag walls.

22. The vehicle occupant restraint device according to claim 20, wherein the module housing has a substantially U-shaped configuration with a substantially U-shaped cross-section when viewed in the vertical vehicle direction, wherein the guiding portion is formed by a leg of the U-shape, wherein the opening is defined between terminal end portions of respective legs of the U-shape, the opening pointing in the deployment direction of the airbag.

* * * * *